United States Patent
Bour et al.

(10) Patent No.: US 7,217,441 B2
(45) Date of Patent: *May 15, 2007

(54) METHODS FOR COATING PIPE COMPRISING USING CEMENT COMPOSITIONS COMPRISING HIGH TENSILE STRENGTH FIBERS AND/OR A MULTI-PURPOSE CEMENT ADDITIVE

(75) Inventors: Daniel L. Bour, Bakersfield, CA (US); Lance E. Brothers, Chickasha, OK (US); William J. Caveny, Rush Springs, OK (US)

(73) Assignee: Halliburton Energy Services, Inc.

( * ) Notice: Subject to any disclaimer, the term of this patent is extended or adjusted under 35 U.S.C. 154(b) by 630 days.

This patent is subject to a terminal disclaimer.

(21) Appl. No.: 10/401,711

(22) Filed: Mar. 28, 2003

(65) Prior Publication Data
US 2004/0191439 A1 Sep. 30, 2004

(51) Int. Cl.
*B05D 7/22* (2006.01)

(52) U.S. Cl. ............... 427/230; 427/231; 427/240; 427/403

(58) Field of Classification Search ......... 427/230, 427/231, 240, 403; 118/DIG. 13, 55, 56
See application file for complete search history.

(56) References Cited

U.S. PATENT DOCUMENTS

| | | | |
|---|---|---|---|
| 4,111,710 A | 9/1978 | Pairaudeau et al. | 106/90 |
| 4,557,763 A | 12/1985 | George et al. | 106/90 |
| 4,784,223 A | 11/1988 | Worrall et al. | 166/287 |
| 4,916,012 A | 4/1990 | Sawanobori et al. | 428/367 |
| 4,927,462 A | 5/1990 | Sugama | 106/99 |
| 5,121,795 A | 6/1992 | Ewert et al. | 166/292 |
| 5,123,487 A | 6/1992 | Harris et al. | 166/277 |
| 5,125,455 A | 6/1992 | Harris et al. | 166/292 |
| 5,127,473 A | 7/1992 | Harris et al. | 166/277 |
| 5,238,064 A | 8/1993 | Dahl et al. | 166/293 |
| 5,749,418 A | 5/1998 | Mehta et al. | 166/292 |
| 5,791,380 A | 8/1998 | Onan et al. | 138/149 |
| 5,820,670 A | 10/1998 | Chatterji et al. | 106/727 |
| 5,900,053 A | 5/1999 | Brothers et al. | 106/678 |
| 5,968,255 A | 10/1999 | Mehta et al. | 106/724 |
| 5,972,103 A | 10/1999 | Mehta et al. | 106/728 |
| 6,059,035 A | 5/2000 | Chatterji et al. | 166/293 |
| 6,059,036 A | 5/2000 | Chatterji et al. | 166/294 |
| 6,143,069 A | 11/2000 | Brothers et al. | 106/678 |
| 6,220,354 B1 | 4/2001 | Chatterji et al. | 166/293 |
| 6,230,804 B1 | 5/2001 | Mueller et al. | 166/293 |
| 6,308,777 B2 | 10/2001 | Chatterji et al. | 166/293 |
| 6,332,925 B1 | 12/2001 | Noji et al. | 118/715 |
| 6,397,895 B1 | 6/2002 | Lively | 138/146 |
| 6,458,198 B1 | 10/2002 | Baret et al. | 106/644 |
| 6,488,763 B2 | 12/2002 | Brothers et al. | 106/692 |
| 6,500,252 B1 | 12/2002 | Chatterji et al. | 106/644 |
| 6,527,015 B2 | 3/2003 | Lively | 138/149 |

FOREIGN PATENT DOCUMENTS

| | | |
|---|---|---|
| GB | 408 407 | 4/1934 |
| GB | 526 931 | 9/1940 |

OTHER PUBLICATIONS

Halliburton brochure entitled "Silicalite Cement Additive" dated 1999.
Halliburton brochure entitled "D-AIR 3000 and D-AIR 3000L Defoamers" Dated 1999.
Halliburton brochure entitled "CFR-3 Cement Friction Reducer Dispersant" dated 1998.
Halliburton brochure entitled "CFR-2 Cement Friction Reducer" dated 1999.
Halliburton brochure entitled "ThermalLock6™ Cement For Corrosive $CO_2$ Environments" dated 1999.
Publication entitled "Interface and Mechanical Behaviors Of Fiber-Reinforced Calcium Phosphate Cement Compositions", by T. Sugama et al. Prepared for the Geothermal Division U.S. Department of Energy; Department of Applied Science, Jun. 1992.
Foreign communication from a related counterpart application dated Nov. 30, 2004.

*Primary Examiner*—William Phillip Fletcher, III
(74) *Attorney, Agent, or Firm*—Craig W. Roddy; Baker Botts, LLC.

(57) ABSTRACT

Among the methods provided is a method of coating the interior of a pipe comprising: providing a pipe having an interior surface; providing a cement composition comprising a cement component and high tensile strength fibers and/or a multi-purpose cement additive; coating the cement composition onto the interior surface of the pipe; and allowing the cement composition to set.

24 Claims, No Drawings

METHODS FOR COATING PIPE COMPRISING USING CEMENT COMPOSITIONS COMPRISING HIGH TENSILE STRENGTH FIBERS AND/OR A MULTI-PURPOSE CEMENT ADDITIVE

FIELD OF THE INVENTION

The present invention relates to methods and compositions for coating pipes, and more particularly to improved methods and compositions for protecting pipes from corrosion.

DESCRIPTION OF THE PRIOR ART

Pipes may be exposed to hostile conditions such as high temperatures and corrosive materials. This is particularly true for geothermal steam and production brine transportation pipelines and wells penetrating sources of geothermal energy. To protect pipes from these hostile conditions, various means have been employed. One current method of protecting a pipe from hostile conditions is to apply a cement lining to the inside surface of the pipe, thereby creating a physical barrier between the pipe surface and the material inside the pipe. In addition to protecting the pipe surface from corrosion, such a cement lining also acts as an insulator between the temperatures inside and outside of the pipe. However, such cement linings may crack due to the thermal and mechanical stresses thus reducing the protective and insulating effectiveness of the cement lining.

There are several stressful conditions that have been associated with cement failures, including thermal and mechanical stresses. These stresses may occur as the result of the curing and handling of the cement itself, thermal expansion or compression when flow of hot material through the pipe is begun or ended, thermal expansion or compression when pipe joints are welded, and impact of debris flowing through the pipe.

The stress exerted on the cement as referred to herein means the force applied over an area resulting from the strain caused by the incremental change of a body's length or volume. The stress is generally thought to be related to strain by a proportionality constant known as Young's Modulus. Young's Modulus is known to characterize the flexibility of a material. For example, in a well bore sealing application, the Young's Modulus for non-foamed cements is about $3 \times 10^6$ lb/in$^2$, and for steel pipes, the Young's Modulus is about $30 \times 10^6$ lb/in$^2$.

To resist these stresses, cements should maintain adequate physical properties, e.g., tensile strength, elasticity, and ductility, under severe conditions. Moreover, the cement lining must be sufficiently bonded to the pipe surface such that flexing of the pipe caused by stresses such as those described above does not separate the lining from the pipe surface. The cements must have the ability to effectively maintain adequate bonding, compressive strength, density, and low porosity, even under high temperatures, pressures, and/or in the presence of steam and/or hot brine. In addition, the cement must be able to withstand such conditions over a relatively long period of time.

SUMMARY OF THE INVENTION

The present invention provides methods and compositions for coating pipes, and more particularly to compositions having improved mechanical properties including tensile and bond strength, and methods of using such improved cement compositions, inter alia, to protect pipes from corrosion.

One embodiment of a method of the present invention for coating the interior surface of a pipe comprises providing a pipe and a cement composition wherein the cement composition comprises a cement component and either high tensile strength fibers, multi-purpose cement additive, or both, coating the cement composition onto the interior surface of the pipe, and allowing the cement composition to set.

Another embodiment of a method of the present invention for coating the interior surface of a pipe comprises the steps of providing a pipe to be coated, providing a cement composition wherein the cement composition comprises a cement component and either high tensile strength fibers, multi-purpose cement additive, or both, placing a chosen amount of the cement composition inside the pipe, capping each end of the pipe, rotating the pipe along its longitudinal axis to cause the cement composition to coat the interior surface of the pipe; and allowing the cement composition to set.

One embodiment of the composition of the present invention describes a pipe coating comprising a cement composition wherein the cement composition comprises a cement component and either high tensile strength fibers, multi-purpose cement additive, or both.

Other and further objects, features and advantages of the present invention will be readily apparent to those skilled in the art upon a reading of the description of preferred embodiments which follows.

DESCRIPTION OF PREFERRED EMBODIMENTS

The present invention provides methods and compositions for coating pipes, and more particularly to compositions having improved mechanical properties including tensile and bond strength, and methods of using such improved cement compositions, inter alia, to protect pipes from corrosion.

The improved cement compositions of the present invention comprise fibrous material and/or a multi-purpose cement additive. The fibrous material of the present invention acts, inter alia, to improve the tensile strength and the temperature stability of the cement and make it more resistant to cracking. The multi-purpose cement additive comprises "Universal Cement Systems™," a proprietary additive developed to improve cement bond and compressive strength commercially available from Halliburton Energy Services in Duncan, Oklahoma and described in U.S. Pat. Nos. 5,749,418, 5,968,255 and 5,972,103. U.S. Pat. Nos. 5,968,255 and 5,972,103 are herein incorporated by reference. The multi-purpose cement additive acts, inter alia, to improve the bond between the cement composition and the pipe surface.

While the compositions and methods of the present invention are useful in a variety of applications, they are particularly useful in transport pipeline operations. Moreover, in addition to protecting pipe surfaces from corrosion, the cement compositions and methods of the present invention are also suitable for use as pipe insulating means. Additives suitable for use in well bore cementing operations also may be added to the cement compositions of the present invention if desired; selection of such additives is within the ability of one skilled in the art with the benefit of this disclosure.

The multi-purpose cement additive suitable for use in the present invention comprises iron chloride, a dispersing agent, an organic acid, a hydratable polymer, and an ultra-fine particulate hydraulic cement. The multi-purpose cement additive may further comprise an alkali-or alkaline-earth halide, a defoaming agent, particulate ASTM Type II cement, fumed silica, or combinations thereof. Preferably, the multi-purpose cement additive is present in the amount of about 0.1% by weight of cement to about 3% by weight of cement in the cement composition, more preferably from about 0.5% by weight to about 2% by weight.

The iron chloride in the multi-purpose cement additive may be ferrous chloride, ferric chloride, or mixtures thereof. The iron chloride functions, inter alia, to overcome the effect of a high metal sulfate concentration in the cement composition and to shorten the thickening time of the cement composition. That is, the iron chloride, in combination with the other multi-purpose cement additive components, aids the cement composition in hydrating in a predictable manner. The iron chloride component also improves the compressive strength of the cement composition in which the multi-purpose cement additive is used.

The dispersing agent in the multi-purpose cement additive acts, inter alia, to control the rheology of the cement composition and to stabilize the cement composition over a broad density range. While a variety of dispersing agents known to those skilled in the art may be used in accordance with the present invention, a preferred dispersing agent is a water-soluble polymer prepared by the caustic-catalyzed condensation of formaldehyde with acetone wherein the polymer contains sodium sulfate groups. Such a preferred dispersing agent is commercially available under the trade designation "CFR-3™" from Halliburton Energy Services of Duncan, Okla. Another suitable dispersant is commercially available under the trade designation "CFR-2™," also from Halliburton Energy Services in Duncan, Okla.

The organic acid in the multi-purpose cement additive acts, inter alia, to maintain the viscosity of the cement composition in which the multi-purpose cement additive is used over a broad density range by helping to prevent gelation of the cement composition. Various organic acids can be utilized in the multi-purpose cement additive including, but not limited to, tartaric acid, citric acid, gluconic acid, oleic acid, phosphoric acid, and uric acid. Of these, tartaric acid is preferred.

The hydratable polymer in the multi-purpose cement additive acts, inter alia, to increase the viscosity of the final cement composition in which the multi-purpose cement additive is used. Various hydratable polymers can be utilized in the multi-purpose cement additive including, but not limited to, carboxymethylcellulose, hydroxyethylcellulose, carboxymethylhydroxyethylcellulose, vinyl sulfonated polymers, and hydratable graft polymers. Of these, hydroxyethylcellulose is preferred.

The presence of ultra-fine particulate hydraulic cement acts, inter alia, to increase the compressive strength of the final cement composition in which the multi-purpose cement additive is used and contributes to shortening the thickening time of the final cement composition. The ultra-fine particulate hydraulic cement in the multi-purpose cement additive preferably has a maximum particle size of about 15 microns. The distribution of the various size particles within the ultra-fine cement is more preferably such that about 90% of the particles have diameters not greater than about 10 microns, 50% have diameters not greater than about 5 microns, and 20% have diameters not greater than about 3 microns. The specific surface area of the ultra-fine cement, an indication of the ability of the cement to chemically interact with other materials, is preferably greater than about 12,000 square centimeters per gram, and more preferably greater than about 13,000 square centimeters per gram. A preferred ultra-fine hydraulic cement is a Portland cement. One such suitable cement is commercially available under the trade designation "MICRO-MATRIX™" from Capital Cement Co. of San Antonio, Tex.

The multi-purpose cement additive may also include a defoaming agent. While a variety of defoaming agents known to those skilled in the art may be used in accordance with the present invention, a preferred defoaming agent is commercially available under the trade designation "D-AIR 3000™" from Halliburton Energy Services of Duncan, Okla. Moreover, the multi-purpose cement additive may also include an alkali-or alkaline-earth metal halide. Suitable alkali-or alkaline-earth metal halides include, but are not limited to, calcium chloride, sodium chloride, potassium chloride, and ammonium chloride, with calcium chloride being preferred.

One preferred multi-purpose cement additive composition for use in the present invention comprises an iron chloride present in an amount of about 10 part by weight, a dispersing agent present in an amount of about 13 parts by weight, an organic acid present in an amount of about 0.4 parts by weight, a hydratable polymer present in an amount of about 2 parts by weight and an ultra-fine particulate hydraulic cement present in an amount of about 8 parts by weight.

The fibers utilized in the cement compositions of the present invention preferably exhibit a high tensile modulus and a high tensile strength. Such fibers will be referred to herein as "high tensile strength fibers." In certain preferred embodiments, to achieve certain of the advantages associated with the present invention, the tensile modulus of the fibers may exceed 180 GPa, and the tensile strength of the fibers may exceed 3000 MPa. The fibers preferably have a mean length of about 1 mm or less. In certain preferred embodiments, carbon fibers are used. Where carbon are used, it is preferred that they have a mean length from about 50 to about 500 microns, more preferably the fibers have a mean length in the range of about 100 to about 200 microns, most preferably, they are milled carbon fibers. An example of suitable carbon fibers includes "AGM-94" carbon fibers commercially available from Asbury Graphite Mills, Inc., of Asbury, N.J. AGM-94 fibers have a mean length of about 150 microns and a diameter of about 7.2 microns. Another example of suitable carbon fibers includes the "AGM-99" carbon fibers, also available from Asbury Graphite Mills, Inc., which have a mean length of about 150 microns and a diameter of about 7.4 microns. Preferably, the carbon fibers are present in the amount of about 1% by weight of cement to about 15% by weight of cement in the cement composition. Carbon fibers are able to withstand extreme conditions and are suitable for use in conditions such as high temperatures and/or high pressures.

In another embodiment, rubber particles may be added to the cement compositions of the present invention. Such rubber particles may be ¼ inch or less, preferably in the range of about 10/20 to 20/30 mesh. The particles can be obtained from any suitable source. One example of such a suitable source is recycled automobile tires, which may be obtained from, for example, Four D Corporation of Duncan, Okla. Vulcanized rubber particles are suitable. Preferably, the rubber particles are present in the amount of about 0.5% to about 30% by weight of the cement in the cement composition.

It has been found that adding rubber particles to a cement composition affects the mechanical properties of the cement composition by, inter alia, improving its elasticity and ductility. This is desirable to counteract the possible stresses the cement lining may endure. However, when rubber particles are added in quantities sufficient to desirably affect the elasticity of the cement, the tensile strength of the cement is also reduced. Thus, rubber particles are most preferably only incorporated into cement compositions of the present invention where high tensile strength fibers are used. One of ordinary skill in the art, with the benefit of this disclosure, will recognize the suitability of rubber particles given the conditions the cement may endure.

Any cement suitable for use in subterranean cementing operations may be used in the cement composition of the present invention. Preferably, cement compositions of the present invention include amorphous silica powder and fine silica flour. Where used, the amorphous silica powder will be present in amounts up to about 10% by weight of the cement composition. In one embodiment of the present invention the amorphous silica powder may be "SILICALITE™," available from Halliburton Energy Services in Duncan, Okla. Where used, the fine silica flour will be present in amounts up to about 30% by weight of the cement composition. In one embodiment of the present invention, the fine silica flour may be "SSA-1™," available from Halliburton Energy Services in Duncan, Okla. In one embodiment, the improved cement compositions of the present invention comprise a hydraulic cement. A variety of hydraulic cements are suitable for use in the compositions and methods of the present invention including those comprised of calcium, aluminum, silicon, oxygen, and/or sulfur, which set and harden by reaction with water. Such hydraulic cements include, but are not limited to, Portland cements, pozzolana cements, gypsum cements, high alumina content cements, silica cements, and high alkalinity cements. A preferred cement is commercially available under the trade designation "THERMALOCK™," from Halliburton Energy Services in Duncan, Okla. and described in U.S. Pat. No. 6,488,763, herein incorporated by reference.

The water utilized in the cement compositions of this invention can be fresh water, salt water (e.g., water containing one or more salts dissolved therein), brine (e.g., saturated salt water produced from subterranean formations), or seawater. Generally, the water can be from any source provided that it does not contain an excess of compounds that adversely affect other components in the cement composition or the performance of the cement composition relative to the hostile conditions to which it may be subject. The water is combined with the dry cement to create a handleable slurry. In a preferred embodiment, the amount of water used ranges from about 5 to about 10 gallons of water per 100 pounds of dry cement.

As will be recognized by those skilled in the art, the cement compositions of the present invention can also include additional additives such as sodium chloride, dispersants, defoaming agents, weighting materials, and the like. Preferably, sodium chloride is present in amounts up to about 5% by weight of the water used in the cement composition. While a variety of dispersing agents known to those skilled in the art may be used in accordance with the present invention, a preferred dispersing agent is a water-soluble polymer prepared by the caustic-catalyzed condensation of formaldehyde with acetone wherein the polymer contains sodium sulfate groups. Such a preferred dispersing agent is commercially available under the trade designation "CFR-3™" from Halliburton Energy Services of Duncan, Okla. Another suitable dispersant is commercially available under the trade designation "CFR-2™," also from Halliburton Energy Services in Duncan, Okla. Preferably, the dispersing agent is present in amounts up to about 3% by weight of the cement composition, more preferably in amounts up to about 1.5% by weight of the cement composition and most preferably in amounts up to about 0.75% by weight of the cement composition. While a variety of defoaming agents known to those skilled in the art may be used in accordance with the present invention, a preferred defoaming agent is commercially available under the trade designation "D-Air 3000™" from Halliburton Energy Services of Duncan, Okla. Preferably, the defoaming agent is present in amounts up to about 2% by weight of the cement composition, more preferably in amounts up to about 1% by weight of the cement composition and most preferably in amounts up to about 0.5% by weight of the cement composition.

The cement compositions of the present invention may also include other additives such as accelerants or retarders, if desired. If an accelerant is used, the accelerant is preferably calcium chloride and is present in an amount from about 1.0% to about 2.0% by weight of the cement in the composition.

The cement compositions of the present invention may be used to coat the interior diameter of a pipe to a thickness from about 0.2 inches to about 1.5 inches, preferably from about 0.3 inches to about 0.7 inches and most preferably to about 0.5 inches. The depth of cement coat needed for the individual application may be determined by one skilled in the art with the benefit of this disclosure and will depend on a variety of factors including the conditions to which the coating will be subjected, and the like.

The cement composition of the present invention can be coated on the interior diameter of a pipe in any suitable manner. In one method, the pipe to be coated is held horizontally, a cement composition of the present invention is introduced to the interior of the pipe, which has been capped at each end to retain the cement composition inside the pipe, and then the pipe is spun along its longitudinal axis to substantially evenly distribute the cement composition along the interior of the pipe. In another embodiment, the pipe to be coated may be centered around a pipe of slightly smaller diameter to create a uniform concentric annulus between the pipes of the desired coating depth and cement composition is then pumped into the annulus space. The cement composition is then allowed to set, after which the smaller pipe is removed.

One embodiment of a method the present invention comprises providing a cement composition that comprises high tensile strength fibers and multi-purpose cement additive, coating this cement composition on the interior surface of a pipe, and allowing the cement composition to set therein.

To facilitate a better understanding of the present invention, the following examples of some of the preferred embodiments are given. In no way should such examples be read to limit the scope of the invention.

EXAMPLES

A cement composition of the present invention was created comprising:

TABLE 1

Formulation of cement composition

| Ingredient | Amount |
| --- | --- |
| Silica Flour | 30% by weight of composition |
| SILICALITE ™ additive | 10% by weight of composition |
| Sodium chloride | 5% by weight of water |
| Universal Cement Systems ™ additive | 1% by weight of composition |
| CFR-3 ™ dispersant | 0.75% by weight of composition |
| D-AIR 3000 ™ defoamer | 0.5% by weight of composition |
| AGM-94 ™ milled carbon fibers | 5% by weight of composition |

The final mixture yielded 94 pounds of a cement composition that was then mixed with 6.42 gallons of water. The final cement yield was 1.64ft$^3$.

The compressive strength of the cement composition over time was evaluated and the results are shown in Table 2, below. The cement composition made according to the present invention allowed sufficiently long handling time to use the mixed cement and yet did not take overly long to harden.

TABLE 2

Compressive Strength of Cement Composition

| | |
| --- | --- |
| Time to achieve compressive strength of 50 psi | 5 hours, 50 minutes |
| Time to achieve compressive strength of 500 psi | 10 hours, 43 minutes |
| Compressive strength at 24 hours | 1800 psi |
| Compressive strength at 48 hours | 2700 psi |
| Compressive strength at 72 hours | 3242 psi |

Therefore, the present invention is well adapted to carry out the objects and attain the ends and advantages mentioned as well as those that are inherent therein. While numerous changes may be made by those skilled in the art, such changes are encompassed within the spirit and scope of this invention as defined by the appended claims.

What is claimed is:

1. A method of coating the interior surface of a pipe comprising the steps of:
   providing a pipe having an interior surface;
   providing a cement composition comprising a cement component and a multi-purpose cement additive, the multi-purpose cement additive comprising iron chloride, a dispersing agent, an organic acid, a hydratable polymer, and an ultra-fine particulate hydraulic cement;
   coating the cement composition onto the interior surface of the pipe; and
   allowing the cement composition to set.

2. The method of claim 1 wherein the cement component is a hydraulic cement.

3. The method of claim 1 wherein the cement component is a calcium phosphate cement.

4. The method of claim 1 wherein the cement composition further comprises a dispersant, a retardant, an accelerant, or a weighting agent.

5. The method of claim 1 wherein the multi-purpose cement additive is present in an amount of about 0.5% to about 3% by weight of the cement component in the cement composition.

6. The method of claim 1 where in the cement composition further comprises high tensile strength fibers.

7. The method of claim 6 wherein the high tensile strength fibers are carbon fibers.

8. The method of claim 7 wherein the carbon fibers are present in an amount of about 1% to about 15% by weight of the cement component in the cement composition.

9. The method of claim 7 wherein the carbon fibers have a mean length of about 150 microns.

10. The method of claim 6 where in the cement composition further comprises rubber particles.

11. The method of claim 10 wherein the rubber particles are present in an amount of about 0.5% to about 30% by weight of the cement component in the cement composition.

12. The method of claim 10 wherein the rubber particles have a mean length of about ¼ inch or less.

13. A method of coating the interior surface of a pipe comprising the steps of:
    providing a pipe to be coated;
    providing a cement composition comprising a cement component and multi-purpose cement additive, the multi-purpose cement additive comprising iron chloride, a dispersing agent, an organic acid, a hydratable polymer, and an ultra-fine particulate hydraulic cement;
    placing a chosen amount of the cement composition inside the pipe;
    capping each end of the pipe;
    rotating the pipe along its longitudinal axis to cause the cement composition to coat the interior surface of the pipe; and
    allowing the cement composition to set.

14. The method of claim 13 wherein the cement component is a hydraulic cement.

15. The method of claim 13 wherein the cement component is a calcium phosphate cement.

16. The method of claim 13 wherein the multi-purpose cement additive is present in an amount of about 0.5% to about 3% by weight of the cement component in the cement composition.

17. The method of claim 13 wherein the cement composition further comprises a dispersant, a retardant, an accelerant, or a weighting agent.

18. The method of claim 13 where in the cement composition further comprises high tensile strength fibers.

19. The method of claim 18 wherein the high tensile strength fibers are carbon fibers.

20. The method of claim 19 wherein the carbon fibers are present in an amount of about 1% to about 15% by weight of the cement component in the cement composition.

21. The method of claim 19 wherein the carbon fibers have a mean length of about 150 microns.

22. The method of claim 18 where in the cement composition further comprises rubber particles.

23. The method of claim 22 wherein the rubber particles are present in an amount of about 0.5% to about 30% by weight of the cement component in the cement composition.

24. The method of claim 22 wherein the rubber particles have a mean length of about inch or less.

* * * * *